United States Patent Office 3,346,683
Patented Oct. 10, 1967

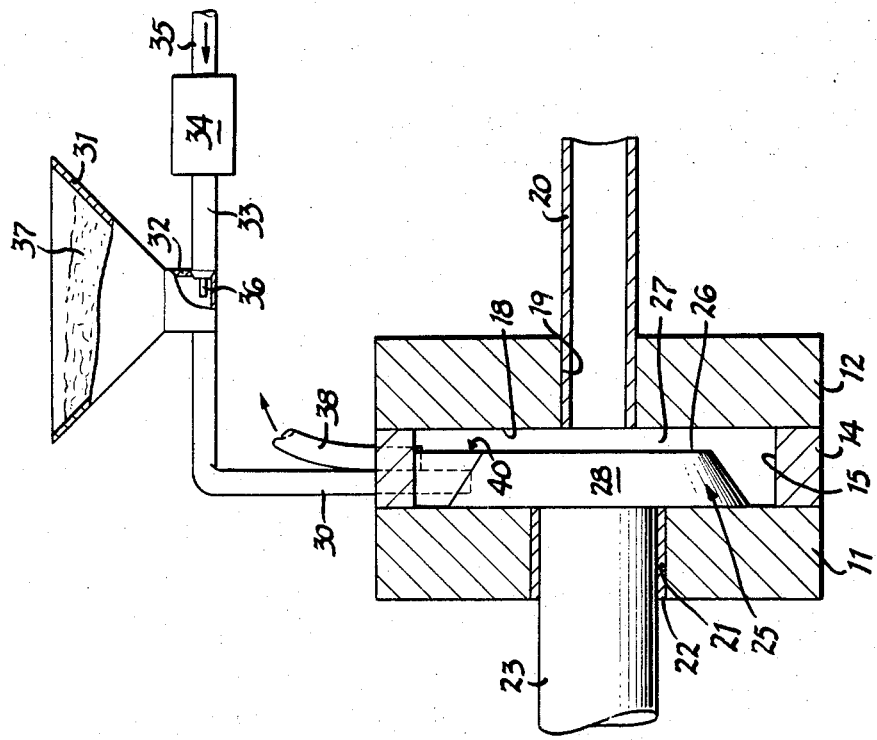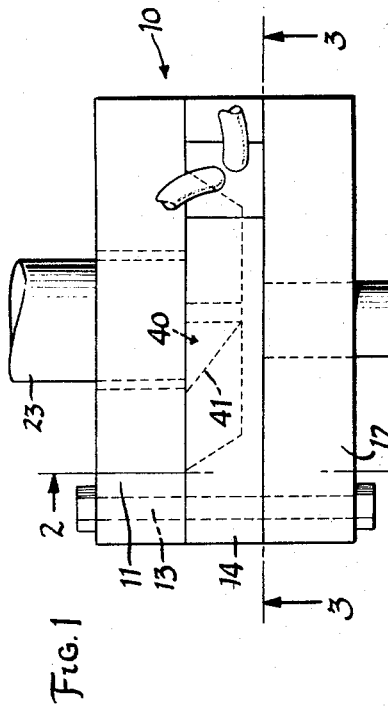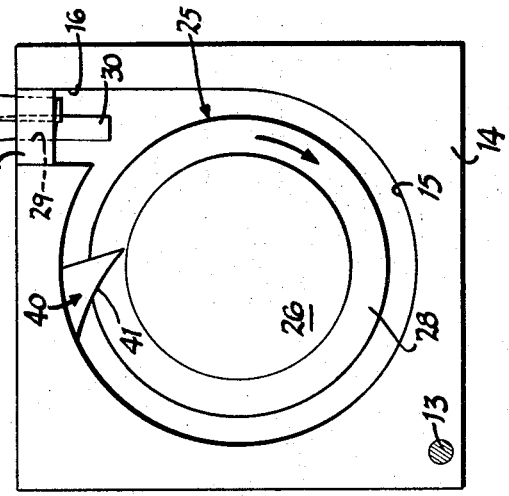

3,346,683
METHOD AND APPARATUS FOR EXTRUDING THERMOPLASTIC MATERIAL
Charles E. Plymale, Maumee, Ohio, assignor to Owens-Illinois, Inc., a corporation of Ohio
Filed June 1, 1964, Ser. No. 371,497
8 Claims. (Cl. 264—169)

ABSTRACT OF THE DISCLOSURE

In an elastic melt extruder having a rotatable disc spaced through a narrow melt gap from a corresponding face of an orifice plate, a feeding apparatus and method is provided in which finely divided thermoplastic material is suspended in a gas stream, the gas stream and suspended material is directed against a peripheral surface of the rotatable disc, and the suspended material becomes thermally adhered to the peripheral surface of the disc. The adhered material is removed from the disc by scraping the peripheral surface, and the scraped material is directed into the melt gap by the scraper element.

---

The present invention relates to an improved extrusion method and apparatus, and more particularly to an elastic melt extruder incorporating a novel apparatus for and method of supplying particulate material to the melt chamber.

There has been recently developed a new type of plasticizer-extruder commonly known as an "elastic melt extruder" utilizing "the normal force effect," i.e., the normal force developed when a visco-elastic material is sheared between a rotating plate and a stationary plate to perform the functions of a conventional plasticizer-extruder. Such an elastic melt extruder is described in "Modern Plastics Magazine" of October 1959, at page 107, in an article by Bryce Maxwell and Anthony J. Scalora.

An elastic melt extruder utilizes a power driven rotatable disc operable within a cylindrical chamber provided with an inlet to which solid plastic material is furnished. A radial face of the disc is spaced on confronting relation with and through a narrow melt gap from the corresponding face of an orifice plate having an exit orifice axially aligned with the disc. As the disc is rotated, the thermoplastic material which is introduced in solid form peripherally of the disc, is confined between the radial faces of the disc and the orifice plate, so as to be subjected to shearing forces. The thermoplastic material is essentially elastic, and the tendency of the sheared material for elastic recovery after arcuate shearing and stretching between the radial faces effects centripetal flow of material between the discs and the orifice plate toward the central orifice, the material issuing from the orifice in plasticized condition at a predetermined pressure.

One common defect in such extruders is the difficulty of maintaining accurate and rapid introduction of solid plasticized material into the melt chamber. The simplest feeding method, of course, is merely allowing the solid material to gravitationally fall into a tangential inlet opening. Such feeding is non-positive, irregular and requires the utilization of uniformly sized or "pelletized" material. The utilization of a power driven feed screw has recently been proposed. This power feed system works well, although considerable additional apparatus, driving mechanism and the like are required.

The present invention now proposes an extremely simple and effective feed mechanism which accommodates the utilization of solid thermoplastic material which need not be pelletized (i.e., flake or powdered, which need not be uniform in size and shape and which effects a positive feed at feed rates unattainable by the formerly used gravitational methods.

More specifically, the present invention forms a fluid suspension of finely divided particles of thermoplastic material and then introduces this fluid suspension into the melt chamber. By directing the stream of fluid-suspended particles directly against a peripheral surface of the rotatable disc, the thermoplastic particles become thermally adhered to the disc, the discs being heated by the exothermic visco-elastic plasticizing process. By thermally adhering the particles to the disc, the fluid can merely be exhausted from the inlet of the plasticizer-extruder.

The thermally adherent particles are then removed, preferably by mechanical scraping, from the peripheral surface of the disc for introduction onto the radial face of the disc which, in confronting relation with the fixed plate, defines the melt chamber. Once the material contacts the front or radial face of the disc, the material is centripetally moved through the melt chamber to be finally plasticized and issued therefrom by the forces generated due to the normal force or Weisserman effect.

Of course, the elastic melt extruder of the present invention can be utilized in conjunction with uniform or pelletized plastic material, but substantial material savings can be accomplished by utilizing flake or powdered material, since the formerly required pelletizing step can be eliminated. The suspension fluid is preferably air, which may be heated if desired to avoid excessive heat losses upon impingement of the fluid stream on the rotatable disc. Obviously, other gaseous media than air may be utilized if desired for any reason.

It is, therefore, an important object of the present invention to provide a novel, improved elastic melt extruder incorporating a feed mechanism whereby finely divided thermoplastic material is introduced into the extruder as a fluid suspension.

Another important object of this invention is the provision of an improved method of supplying solid plasticized solid thermoplastic material to an elastic melt extruder by suspending solid thermoplastic material in finely divided form in a fluid stream, injecting the fluid stream into the melt chamber, and separating the fluid stream into solid and fluid components by impinging the stream upon one of the pair of relatively rotatable plates utilized in the extruder.

It is a further important object of this invention to provide an improved elastic melt extruder wherein finely divided thermoplastic material is suspended in a fluid stream, the fluid stream is impinged upon a peripheral surface of a rotatable disc forming a part of the extruder, the thermoplastic material only being thermally adhered to the peripheral surface, and the thermally adherent material being scraped from the peripheral surface for introduction onto that portion of the disc forming the melt gap.

Yet another, and no less important, object of the present invention is the provision of an elastic melt extruder wherein a gaseous stream containing thermoplastic material suspended therein is directed onto one of a pair of relatively rotatable surfaces to be thermally adhered thereon preparatory to introduction into a melt gap.

On the drawings:

FIGURE 1 is a plan elevation view, somewhat schematic in nature, illustrating an elastic melt extruder of the present invention capable of carrying out the method of the present invention;

FIGURE 2 is a vertical sectional view taken along the plane 2—2 of FIGURE 1; and FIGURE 3 is a sectional view taken along the plane 3—3 of FIGURE 1.

As shown on the drawings:

In FIGURE 1, reference number 10 refers generally to an extruder of the present invention, such extruders sometimes being referred to as a "visco-elastic extruder" or an "elastic melt extruder" or a "screwless extruder" capable of plasticizing thermoplastic material for issuance from an orifice at a predetermined pressure. Generally, the extruder comprises a fixed rear plate 11 and a fixed front plate 12 which are secured together by suitable means, as by bolts 13. Interposed between the plates 11 and 12 is a central spacer plate 14 which is provided with a central generally cylindrical aperture 15 communicating with a tangential inlet opening 16 closed by a rectangular plug or closure 17. The front plate 12 has a planar interior face 18 closing one open side of the aperture 15, and the plate 12 is pierced by a centrally located bore 19 in which is fitted a fixed outlet or orifice tube 20.

The rear plate 11 is centrally apertured, as at 21, to receive a bearing sleeve 22 journaling therein a rotatable shaft 23 which is rotated by suitable means (not shown) such as an electric or hydraulic motor or the like. Secured to that end of the shaft 23 projecting into the aperture 15 and rotatable with the shaft is a plate or disc 25, this plate having a circular front face 26 spaced from the front plate face 18 through a gap 27. The circular front face 26 is circumscribed by a peripheral frusto-conical face 28 which is inclined axially inwardly toward the front face 26.

The plug or closure 17 is vertically apertured, as at 29, to receive therethrough an inlet tube or delivery tube 30, the inner end of this tube 30 projecting into the tangential inlet opening 16 into close proximity to the peripheral face 28 of the rotatable disc 25. The upper end of the tube 30 communicates directly with a supply hopper 31, the hopper having a lower hollow extension 32 opening onto the tube 30. The extension 32 of the hopper 31 receives through a wall thereof a conduit 33 communicating through a control valve 34 with a supply conduit 35 connected to a suitable source of air or other fluid under pressure.

A nozzle 36 projects into the hopper extension 35 in directly opposing relation to the adjacent open end of the conduit 30, so that air under pressure passing through the conduit 35, the valve 30 and the nozzle 36 will pass through the hopper extension to form a fluid suspension of finely divided solid thermoplastic material 37 in the hopper 31. This suspension of solid thermoplastic material is conveyed by the conduit 30 into the tangential inlet 16. The location of the outlet end of the conduit 30 immediately adjacent the frusto-conical peripheral face 28 of the disc 25 is such that the material in fluid suspension is impinged directly upon the surface 28.

The surface 28 is at an elevated temperature, either by virtue of the exothermic visco-elastic melting of previously introduced thermoplastic material, or by the utilization of input heaters in the starting of the extruder. The thermoplastic material thus is thermally adhered to the surface 28, this thermal adherence being promoted by the large exposed surface areas of the finely divided particles suspended in the fluid stream. Fluid under residual pressure and free of solid thermoplastic material is exhausted from the inlet chamber 16 by means of an exhaust conduit 38 having its intake located in spaced relation to the outlet end of the conduit 30 and well above the point of entry of the material-laden fluid stream issuing from the conduit 30.

As illustrated in FIGURE 3 of the drawings, the direction of rotation of the disc 25 is clockwise, and the material thermally adhered to the surface 28 is carried in the clockwise direction by the rotatable disc 25. Located at the upper portion of the aperture 15 and carried by the medial plate 14 is a plow indicated generally at 40 and having a slightly curved, axially extending edge 41 overlying and preferably contacting the surface 28. This plow surface 41 extends generally tangentially of the circular front face 26 of the rotatable disc 25 and serves to physically scrape thermally adherent particles therefrom, the surface 41 directing such particles radially inward onto the surface 26. Once the particles reach the surface 26 or the gap 27 between the surface 26 of the disc and the surface 18 of the front plate 12, the particles are subject to the normal force or visco-elastic force exerted thereon to render the material visco-elastic in the manner well known in the art, the material eventually issuing through the orifice tube 20 in plasticized condition.

Thus, it will be readily appreciated that the present invention provides a new and novel visco-elastic extruder and particularly such an extruder incorporating therein a novel and highly desirable apparatus for and method of feeding solid thermal plastic materials into the visco-elastic gap 27.

The utilization of the finely divided thermoplastic material is advantageous for several reasons. First, this material is substantially cheaper than pelletized material, inasmuch as the normally required pelletizing operation need not be carried out and the material may be purchased in bulk. Secondly, the finely divided material can be readily suspended in the fluid stream for conveyance through the conduit 30. Thirdly, the vastly increased surface area per unit weight of such material renders the material readily thermally adhesive to the surface 28.

If desired, the air or other fluid medium introduced through the conduit 35 may be preheated to avoid excess thermal losses from the disc 25.

The thermal efficiency of the extruder is substantially increased by the method of the present invention, inasmuch as the solid thermoplastic material must be rendered at least partially liquid or viscous before the normal force effect can be utilized to advance the material centrifugally toward the outlet orifice. By accomplishing the initial melting or at least partial melting of the material at the surface 28, the area of face 26 can be substantially reduced and a smaller disc 25 can be utilized or a gap 27 of greater axial extent may be utilized, thereby increasing the output of the extruder for its size.

Actually, the invention involves the formation of a fluid suspension of thermoplastic material, the suspension being separated into its components peripherally of the gap 27 and the thermoplastic component only being introduced into the gap in a condition conducive to immediate and effective exertion of the normal force effect thereon.

While an exemplary embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. In an elastic melt extruder having a casing providing a central generally cylindrical recess and a tangential inlet passage, a closure plate fixed to said casing and having its inner face defining one surface of a melt chamber, said plate having a central outlet orifice opening onto said chamber, a rotatable plate centrally located in said chamber and rotatable about an axis coxially with said orifice, said rotatably plate having a front face spaced from the closure plate inner face in confronting relation to define a melt gap therebetween and means for rotating said plate, the improvements of providing said rotatable plate with a peripheral surface of substantial area passing adjacent said casing inlet passage as said rotatable plate is rotated in said recess, a supply conduit having an outlet end disposed in said tangential inlet passage adjacent the peripheral surface of said rotatable plate, means for introducing a suspension of finely-divided thermoplastic material in a gaseous medium into said supply conduit for adherence to said peripheral surface, means exhausting said medium from said passage, and a fixed scraper blade carried by said casing and projecting into scraping relation to said plate peripheral surface to remove adherent material therefrom, said scraper blade extending to said melt gap for directing the removed thermoplastic material into said melt gap for plasticization thereof.

2. In a method of plasticizing thermoplastic material in an elastic melt extruder having a tangential inlet chamber merging into a melt chamber partially defined by an end face of a rotatable disc, the steps of suspending finely divided solid thermoplastic material in a gaseous medium, injecting the so-suspended material into the inlet chamber, thermally adhering the material to an edge surface of the disc, venting said fluid medium from said inlet chamber, scraping the adhered material from the edge surface of the disc with a scraper blade, and introducing the scraped material into said melt chamber by directing the material with the scraper blade into said melt chamber.

3. An elastic melt extruder comprising a casing having therein a central generally cylindrical recess and a tangential inlet passage, a closure plate fixed to said casing and having its inner face defining one surface of a melt chamber, said plate having a central outlet orifice opening onto said chamber, a rotatable plate centrally located in said chamber and rotatable about an axis coaxial with said orifice, said rotatable plate having a front face spaced from the closure plate inner face in confronting relation to define a melt gap therebetween and also having a peripheral frusto-conical surface inclined radially inwardly toward said front face, successive portion of said peripheral surface passing adjacent said casing inlet passage as said rotatable plate rotates in said recess, an inlet conduit having an intake end communicating with a source of air under pressure and with a source of solid finely divided thermoplastic material to receive said material suspended in a stream of air, said conduit having an outlet end disposed in said tangential inlet passage adjacent the peripheral surface of said rotatable plate for directing the suspended material and air on to said peripheral surface, means for exhausting air under pressure from said passage, a scraper blade carried by said casing and projecting into scraping relation to said plate peripheral surface, said scraper blade extending to said melt gap to direct material scraped from said peripheral surface into said melt gap for visco-elastic passage therethrough, and means for rotating said rotatable plate.

4. In a method of plasticizing thermoplastic material utilizing an elastic melt extruder having an inlet chamber communicating with a melt gap defined partially by an end face of a rotatable plate surrounded by a peripheral edge of appreciable area, the steps of injecting into the inlet chamber and against said peripheral edge a stream of fluid having suspended therein finely divided thermoplastic material, thermally adhering the thermoplastic material to the peripheral edge of said plate, venting said fluid medium from said inlet chamber, and transferring the thermoplastic material from said peripheral edge into said melt gap by scraping the adhering material from said edge and simultaneously directing the scraped material into said melt gap.

5. In a method of plasticizing thermoplastic material utilizing an elastic melt extruder in which a rotatable plate has an end face defining one surface of a melt gap and an edge surface circumscribing the end face, the steps of directing against said plate edge surface a gaseous stream in which is suspended solid finely divided thermoplastic material, thermally adhering the thermoplastic material to said edge surface to remove said material from said stream, and transferring said adhered material from said edge surface to said melt gap for visco-elastic passage therethrough by scraping the adhered material from said edge surface with a scraper and simultaneously directing the scraped material into said melt gap with said scraper.

6. In an elastic melt extruder having a casing providing a central generally cylindrical recess and an inlet passage, a pair of relatively rotatable plates having confronting faces defining a melt gap therebetween, and means defining an axial outlet orifice in one of said plates, the improvements of providing one of said relatively rotatable plates with a peripheral surface of substantial area surrounding the melt gap, a supply conduit having an outlet end disposed in said inlet passage adjacent the peripheral surface of said one plate, means for introducing a suspension of thermoplastic material in a gaseous medium into said supply conduit for adherence to said peripheral surface, means exhausting said medium from said passage, and scraping means projecting into scraping relation to said peripheral surface of said one plate and movable relative thereto to remove adherent material therefrom, said scraper means extending to said melt gap for directing the removed material into said melt gap for visco-elastic passage therethrough.

7. In a method of plasticizing thermoplastic material utilizing an elastic melt extruder in which a pair of relatively rotatable plates have their confronting end faces spaced to define therebetween a melt gap, one of the plates being radially enlarged to define a peripheral surface surrounding the melt gap, the steps of directing against the peripheral surface of said one plate a gaseous stream in which is suspended solid finely divided thermoplastic material, thermally adhering the thermoplastic material to said peripheral surface to remove said material from said stream, and transferring said adhered material from said peripheral surface to said melt gap for visco-elastic passage therethrough by scraping the adhered material with a scraper and directing the scraped material with said scraper into said melt gap.

8. An elastic melt extruder including in combination a casing having a generally cylindrical chamber therein and having an inlet passage leading from the exterior of said casing tangentially into said chamber, a fixed plate forming a part of said casing and having an inner face defining one surface of said chamber, said fixed plate having a central outlet orifice through the same opening into said chamber, a rotatable plate in said chamber and rotatable about an axis coaxial with said orifice, said rotatable plate having a front face spaced from the inner face of said fixed plate in confronting relation to define a melt gap between said faces and also having a peripheral surface which rotates past said inlet passage as said rotatable plate rotates in said chamber, means for rotating said rotatable plate, a source of finely divided thermoplastic material, a source of air under pressure, an inlet conduit communicating with both of said sources to receive therefrom finely divided thermoplastic material suspended in a stream of air, said inlet conduit having an outlet end disposed in said tangential inlet passage directed toward said peripheral surface of said rotatable plate for directing the suspended material and air on to said peripheral surface where the suspended material adheres in the operation of said extruder, an outlet conduit having an inlet end located in said passage and leading to the exterior of said casing for exhausting air from said passage, and a scraper blade carried by said casing and projecting into said scraping relation to said peripheral surface of said rotatable plate for scraping adhered thermoplastic material from said peripheral surface, said scraper blade extending to said melt gap to direct material scraped from said peripheral surface into said melt gap for visco-elastic passage therethrough.

References Cited

UNITED STATES PATENTS

| | | | |
|---|---|---|---|
| 3,082,476 | 3/1963 | Bunch | 264—176 |
| 3,099,045 | 7/1963 | Honkanen | 264—41 |
| 3,153,686 | 10/1964 | Adams | 264—176 |
| 3,217,364 | 11/1965 | Genest | 18—5 |

ROBERT F. WHITE, *Primary Examiner.*

G. AUVILLE, *Assistant Examiner.*